United States Patent
Furukawa et al.

(10) Patent No.: US 9,601,966 B2
(45) Date of Patent: Mar. 21, 2017

(54) INNER-ROTOR MOTOR INCLUDING PRELOAD MEMBER

(71) Applicant: Nidec Corporation, Kyoto (JP)

(72) Inventors: Keizo Furukawa, Kyoto (JP); Kazuya Kitaji, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 342 days.

(21) Appl. No.: 14/267,034

(22) Filed: May 1, 2014

(65) Prior Publication Data
US 2015/0084461 A1    Mar. 26, 2015

(30) Foreign Application Priority Data
Sep. 26, 2013   (JP) ................................. 2013-199199

(51) Int. Cl.
     *H02K 5/16*      (2006.01)

(52) U.S. Cl.
     CPC .................................... *H02K 5/161* (2013.01)

(58) Field of Classification Search
     CPC .......... H02K 5/161; H02K 5/16; H02K 5/173; H02K 5/1732; H02K 5/15
     USPC ............................... 310/90, 89, 91, 402, 407
     See application file for complete search history.

(56) References Cited

U.S. PATENT DOCUMENTS

| | | | |
|---|---|---|---|
| 5,723,926 A * | 3/1998 | Obara | ....................... H02K 5/15 310/90 |
| 2004/0217669 A1 | 11/2004 | Fujii et al. | |
| 2006/0071563 A1 | 4/2006 | Fujii | |
| 2006/0138877 A1 * | 6/2006 | Akabane | ................... H02K 1/28 310/90 |
| 2006/0226719 A1 * | 10/2006 | Nakanishi | ................ H02K 7/20 310/112 |
| 2009/0121570 A1 * | 5/2009 | Nishikawa | ........... H02K 5/1732 310/90 |
| 2011/0169358 A1 | 7/2011 | Furukawa et al. | |
| 2011/0285251 A1 * | 11/2011 | Raczek | ................ H02K 5/1732 310/401 |

FOREIGN PATENT DOCUMENTS

| | | |
|---|---|---|
| CN | 2272164 Y | 1/1998 |
| CN | 201436773 U | 4/2010 |
| JP | 07-059280 A | 3/1995 |
| JP | 09-154250 A | 6/1997 |
| JP | 11-220860 A | 8/1999 |

(Continued)

*Primary Examiner* — Michael Andrews

(57) ABSTRACT

A motor includes a shaft supported by upper and lower bearings and rotatable about an axis; a rotor magnet fixed to the shaft; a stator arranged radially outside and opposite to the rotor magnet with a gap therebetween; an upper bracket holding the upper bearing; and a lower bracket holding the lower bearing. The upper bracket includes an upper cylindrical cover press fitted to a stator core from above, an upper bearing holding portion, and a top plate portion arranged to join the upper cylindrical cover and the upper bearing holding portion. The lower bracket includes a lower cylindrical cover press fitted to the stator core from below, a lower bearing holding portion, and a bottom plate portion arranged to join the lower cylindrical cover and the lower bearing holding portion. Each of the upper and lower brackets is fixed to the stator core through press fitting.

18 Claims, 10 Drawing Sheets

(56) References Cited

FOREIGN PATENT DOCUMENTS

| | | | |
|---|---|---|---|
| JP | 2004-229429 | A | 8/2004 |
| JP | 2012-191688 | A | 10/2012 |
| JP | 2012-222867 | A | 11/2012 |

* cited by examiner

INNER-ROTOR MOTOR INCLUDING PRELOAD MEMBER

BACKGROUND OF THE INVENTION

1. Field of the Invention

The present invention relates to an inner-rotor motor. In particular, the present invention relates to an improvement in a motor in which a stator is arranged radially outside and opposite to a rotor magnet.

2. Description of the Related Art

In a common inner-rotor motor, a rotor magnet is fixed to a shaft, and a stator is arranged radially outside the rotor magnet. In addition, bearings arranged to support the shaft are arranged on an upper side and a lower side of the rotor magnet, and each of the bearings is supported by a bracket arranged to cover the stator. The shape of the stator depends on desired characteristics of the motor, such as power and torque. Therefore, different brackets should be used for different motors having different desired characteristics, and it is impossible to share the same bracket between the different motors to achieve a reduction in costs of the motors.

Meanwhile, JP-A 11-220860, for example, describes a motor in which both ends of a stator are held by two brackets, and these brackets are fixed and fastened by a fixing screw. Adoption of a structure described in JP-A 11-220860 makes it possible to use the same brackets for different motors whose stators have different axial dimensions.

However, the motor described in JP-A 11-220860 has a problem in that use of the fixing screw is necessary to fix and fasten the brackets, and the number of parts is increased. In addition, the motor described in JP-A 11-220860 has a problem in that fixing screws having different lengths should be used in accordance with the axial dimension of the stator. Furthermore, the motor described in JP-A 11-220860 has a problem in that a space in which the fixing screw is inserted should be secured in the stator, and this leads to a deterioration in magnetic properties of a stator core and a decrease in an energy efficiency of the motor.

An interspace between the brackets depends on the axial dimension of the stator, and is affected by an error in the shape of the stator. Therefore, in the case where ball bearings are used to support a shaft, and a preload in accordance with the interspace between the brackets is applied to each of the ball bearings, the error in the shape of the stator affects the preload applied to each of the ball bearings. That is, variations in manufactured stators may cause vibrations and noise while motors are running, and may cause deterioration in durability of the motors.

SUMMARY OF THE INVENTION

Preferred embodiments of the present invention provide an inner-rotor motor having high efficiency at a low cost.

An inner-rotor motor according to a preferred embodiment of the present invention includes an upper bearing and a lower bearing; a shaft supported by the upper and lower bearings to be rotatable about a rotation axis extending in a vertical direction; a rotor magnet directly or indirectly fixed to the shaft; a stator arranged radially outside and opposite to the rotor magnet with a gap intervening therebetween; an upper bracket arranged to hold the upper bearing; and a lower bracket arranged to hold the lower bearing. The stator includes a stator core, an insulator, and windings wound around the stator core with the insulator intervening therebetween. The upper bracket includes an upper cylindrical cover press fitted to an outer circumference of the stator core from above, an upper bearing holding portion arranged to extend in an axial direction and arranged to hold the upper bearing, and a top plate portion arranged to join the upper cylindrical cover and the upper bearing holding portion to each other. The lower bracket includes a lower cylindrical cover press fitted to the outer circumference of the stator core from below, a lower bearing holding portion arranged to extend in the axial direction and arranged to hold the lower bearing, and a bottom plate portion arranged to join the lower cylindrical cover and the lower bearing holding portion to each other. Each of the upper and lower brackets is fixed to the stator core through press fitting.

The above-described structure makes it possible to use the same brackets for different motors whose stators have different axial dimensions, and eliminates a need to use a fixing screw to fasten the brackets. This prevents an increase in the number of parts, and shared use of the parts leads to a reduction in production costs. In addition, since an insert hole of a fixing screw is not necessary, an improvement in magnetic property of the stator is achieved, and an improvement in an energy efficiency of the motor is achieved.

The inner-rotor motor according to the above preferred embodiment of the present invention may further include a preload member arranged axially adjacent to one of the upper and lower bearings to apply a preload in accordance with a relative distance between the upper and lower brackets to each of the upper and lower bearings. Each of the upper and lower bearings may include an outer race, an inner race, and two or more rolling elements held between the inner and outer races.

The above structure makes it possible to adjust the preload applied to each of the ball bearings at the time of assemblage of the motor to prevent any potential error in the shape of the stator from affecting the preload applied to each of the ball bearings. Accordingly, a reduction in occurrence of vibrations and noise when the motor is running is achieved while an improvement in durability of the motor is achieved.

Preferred embodiments of the present invention make it possible to provide an inner-rotor motor having high efficiency at a low cost.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. For the sake of convenience in description, a direction parallel or substantially parallel to a central axis J of a motor is herein referred to as a vertical direction. However, this definition of the vertical direction should not be construed to restrict in any way the orientation of a motor according to any preferred embodiment of the present invention when in use. In addition, the direction parallel or substantially parallel to the central axis J of the motor is referred to simply by the term "axial direction", "axial", or "axially", radial directions centered on and perpendicular or substantially perpendicular the central axis J are referred to simply by the term "radial direction", "radial", or "radially", and a circumferential direction about the central axis J is referred to simply by the term "circumferential direction", "circumferential", or "circumferentially". In the accompanying drawings, press fit and loose fit are indicated by a cross and a triangle, respectively, as appropriate.

First Preferred Embodiment

Figure 1:
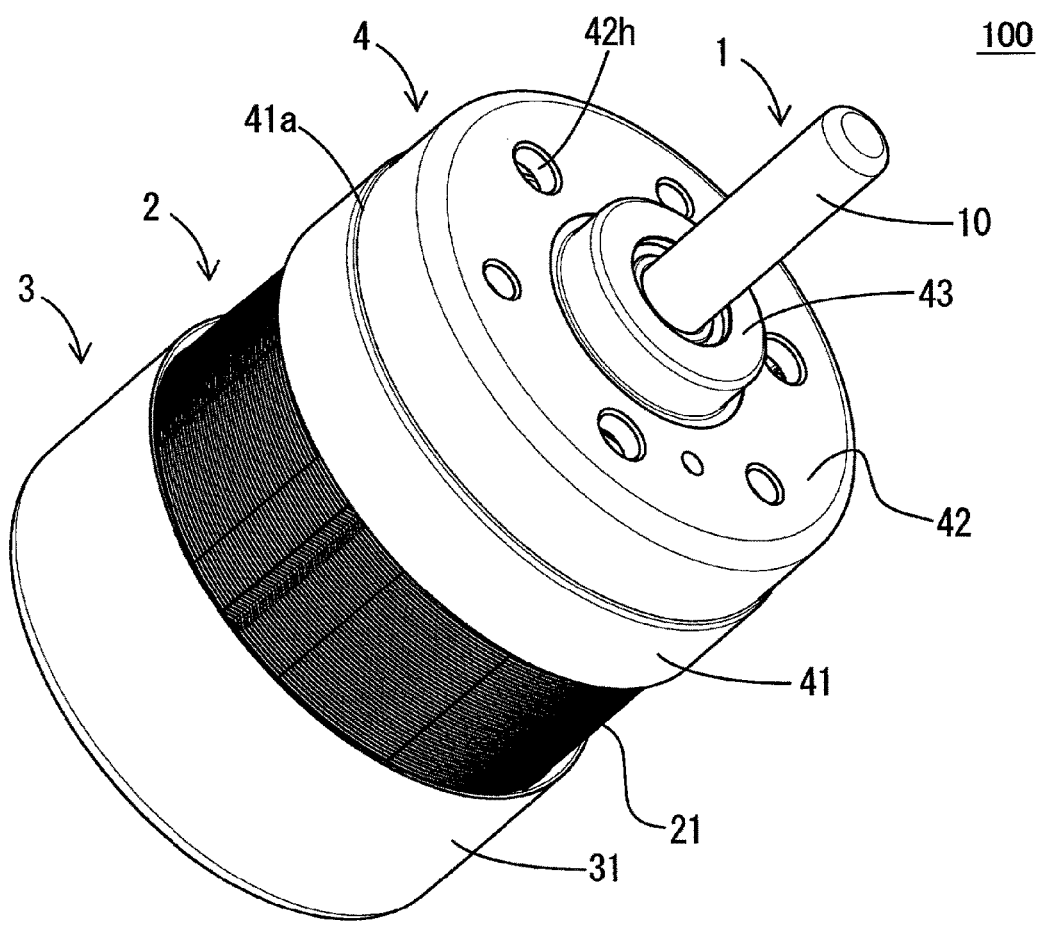
FIG. 1 is a perspective view of an external appearance of a motor 100 according to a first preferred embodiment of the present invention.
Figure 2:
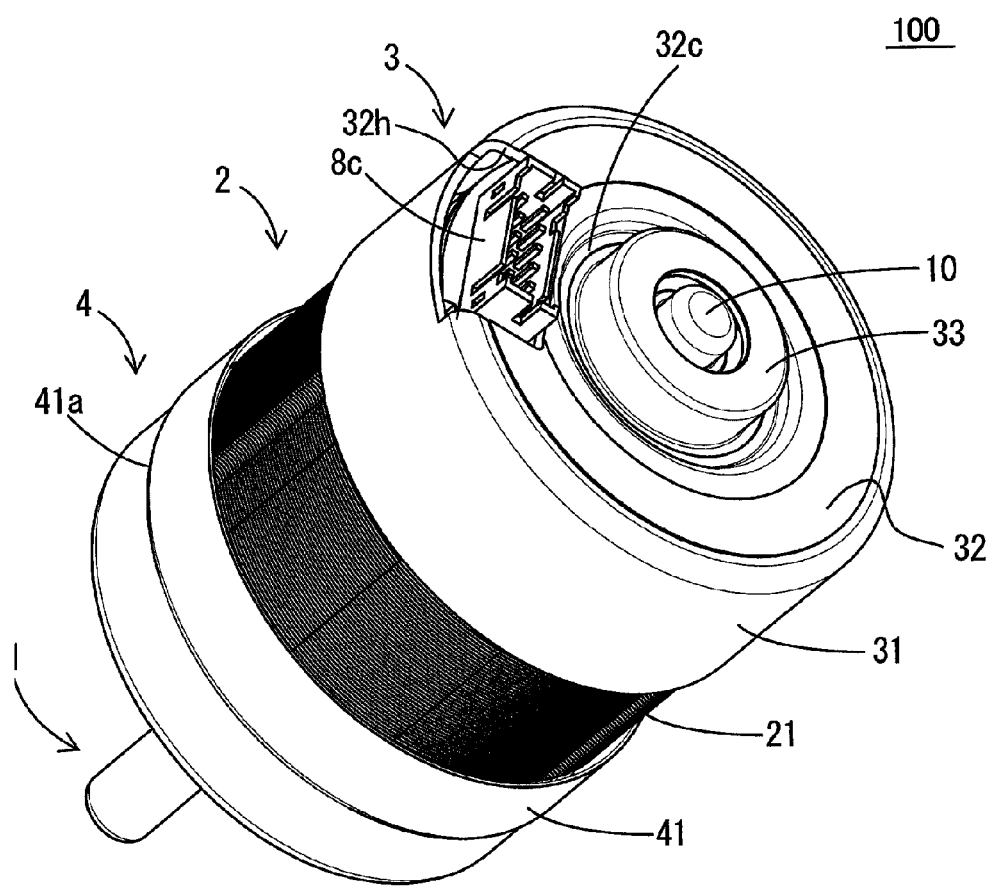
FIG. 2 is a perspective view of the external appearance of the motor 100 according to the first preferred embodiment of the present invention.
Figure 3:
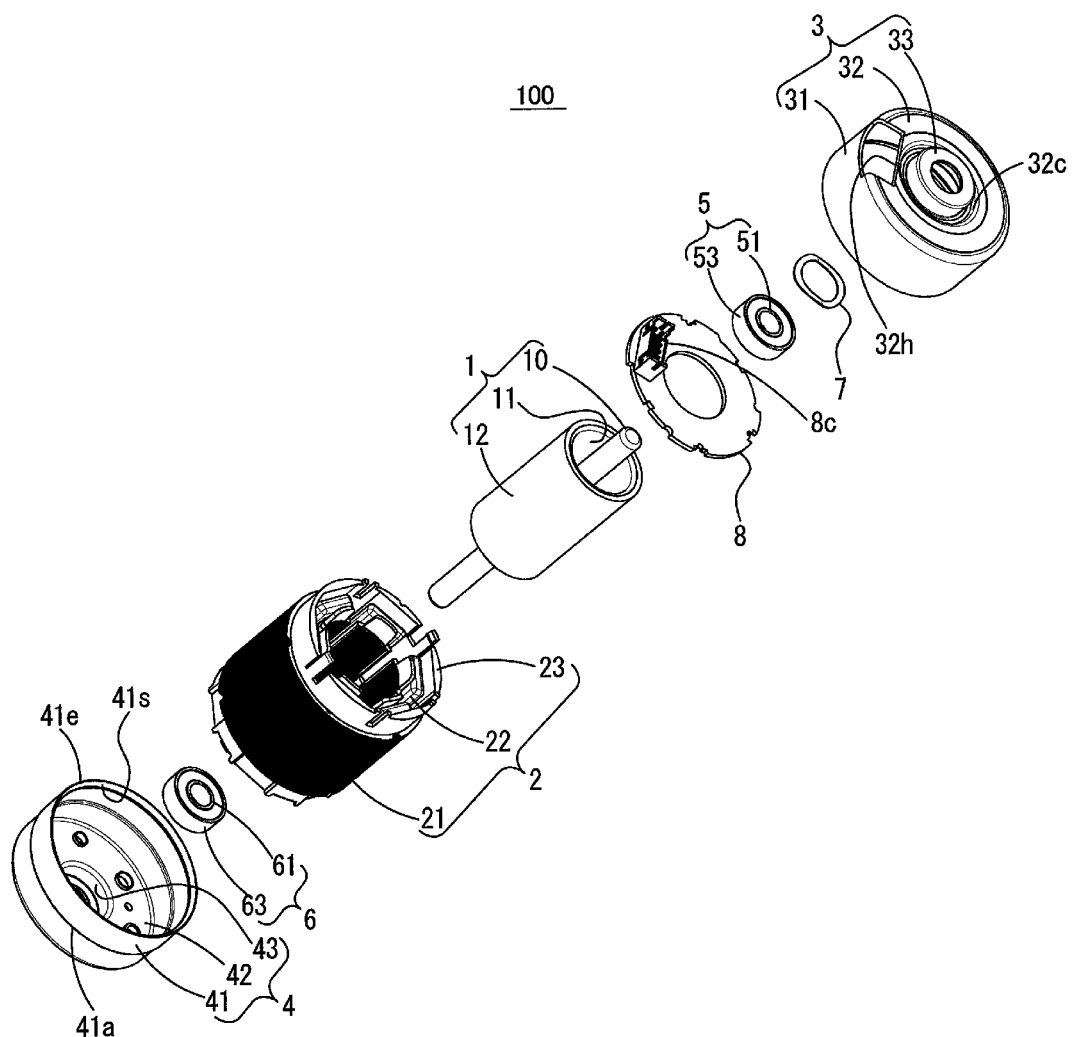
FIG. 3 is an exploded perspective view of the motor 100 illustrated in FIG. 1.
Figure 4:
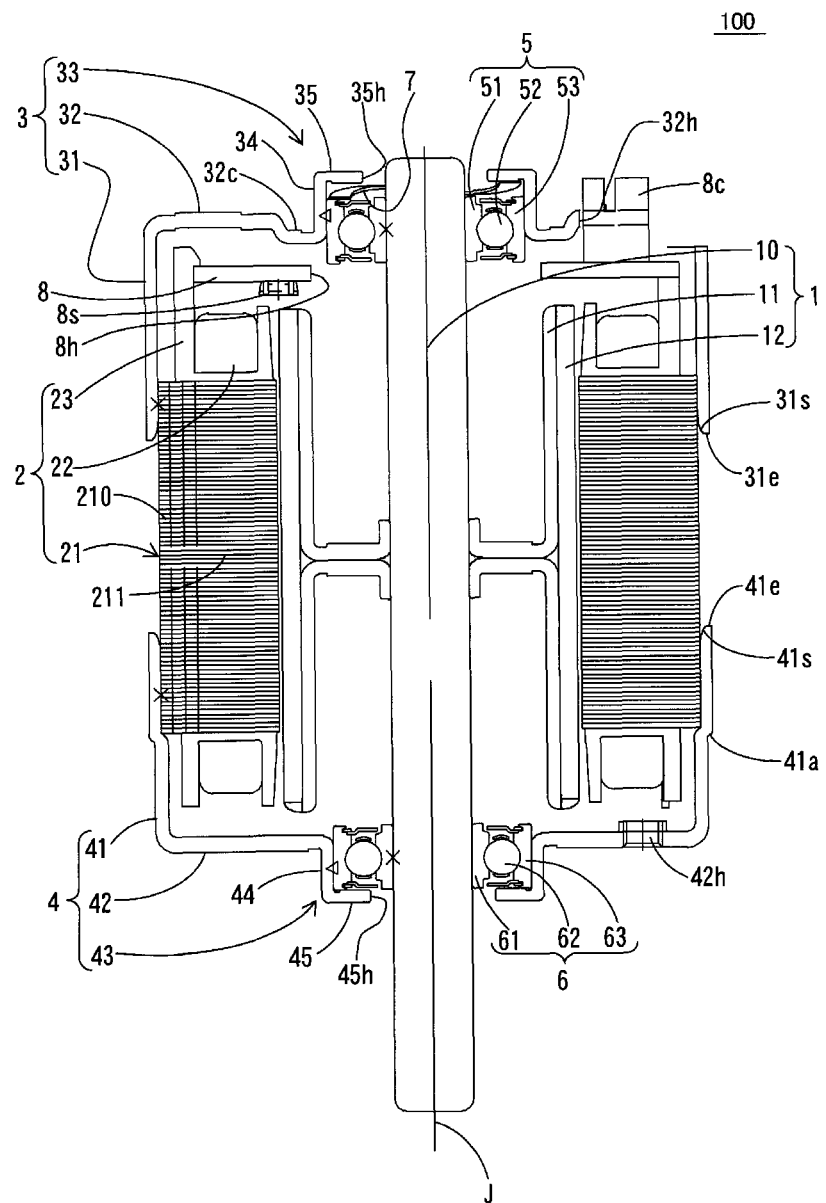
FIG. 4 is a cross-sectional view of the motor 100 illustrated in FIG. 1.

FIGS. 1, 2, 3, and 4 are each a diagram illustrating an exemplary structure of a motor 100 according to a first preferred embodiment of the present invention. FIGS. 1 and 2 are each a perspective view of an external appearance of the motor 100. FIGS. 1 and 2 illustrate the external appearance of the motor 100 as viewed from different directions. FIG. 3 is an exploded perspective view of the motor 100, illustrating components of the motor 100 separated from one another in an axial direction. FIG. 4 is a cross-sectional view of the motor 100, illustrating a section of the motor 100 taken along a plane including the central axis J.

The motor 100 is preferably an inner-rotor motor in which a rotor magnet 12 is fixed to a shaft 10, and a stator 2 is arranged radially outside and opposite to the rotor magnet 12 with a gap intervening therebetween. An upper bearing 5 and a lower bearing 6 arranged to support the shaft 10 are respectively arranged on both axial sides of the rotor magnet 12. Moreover, an upper bracket 3 and a lower bracket 4 are respectively arranged on both axial sides of the stator 2, and the upper bracket 3 and the lower bracket 4 are arranged to hold the upper bearing 5 and the lower bearing 6, respectively.

The motor 100 is preferably used as a driving source of a drive apparatus, such as, for example, a household electrical appliance, an office machine, a medical appliance, or an automobile. The motor 100 preferably includes a stationary portion fixed to a frame of the drive apparatus, and a rotating portion 1 rotatably supported by the stationary portion. The rotating portion 1 preferably includes the shaft 10, a rotor holder 11, and the rotor magnet 12. Meanwhile, the stationary portion preferably includes the stator 2, the upper bracket 3, the lower bracket 4, the upper bearing 5, the lower bearing 6, a preload member 7, and a circuit board 8. These components will be described in detail below.

The shaft 10 is preferably a columnar or substantially columnar member arranged to extend in the axial direction (i.e., the vertical direction). The shaft 10 is supported by the upper and lower bearings 5 and 6, and is arranged to rotate about the central axis J. A lower end portion of the shaft 10 preferably includes a projecting portion arranged to project downward below the lower bracket 4. This projecting portion is used as an output shaft and is joined to a driving portion of the drive apparatus. Note that it may alternatively be arranged such that an upper end portion of the shaft 10 projects upwardly above the upper bracket 3, and that this projecting portion is used as the output shaft and is joined to the driving portion of the drive apparatus.

The rotor holder 11 is preferably a member arranged radially inside the stator 2 and arranged to rotate together with the shaft 10. The rotor holder 11 illustrated in the figures includes a tubular portion arranged to extend in the axial direction, and a joining portion arranged to extend radially inward from an axial middle of the tubular portion. The rotor holder 11 is preferably in or substantially in the shape of the letter "H" when viewed in a section.

The rotor magnet 12 is preferably a cylindrical permanent magnet, and is fixed to an outer circumferential surface of the rotor holder 11. A radially outer surface of the rotor magnet 12 defines a pole surface arranged radially opposite the stator 2. This pole surface is polarized such that north pole surfaces and south pole surfaces alternate with each other in a circumferential direction. Note that the rotor magnet 12 may alternatively be directly fixed to the shaft 10 without use of the rotor holder 11 if so desired.

The stator 2 is an armature of the motor 100. The stator 2 preferably includes a stator core 21, coils 22, and an insulator 23. The stator 2 is preferably cylindrical or substantially cylindrical in shape, and is arranged radially outside the rotor magnet 12. The stator 2 is arranged radially opposite an outer circumferential surface of the rotor magnet 12 with a gap intervening therebetween.

The stator core 21 is defined by laminated steel sheets, i.e., magnetic steel sheets, such as, for example, silicon steel sheets, placed one upon another in the axial direction. The stator core 21 preferably includes an annular core back 210 and a plurality of magnetic pole teeth 211 arranged to project radially inward from the core back 210.

Each coil 22 is preferably defined by a winding wound around a separate one of the magnetic pole teeth 211 of the stator core 21 with the insulator 23 intervening therebetween. Once electrical drive currents are supplied to the coils 22, radial magnetic flux is generated around each of the magnetic pole teeth 211, each of which is a magnetic core. A circumferential torque is thus produced between the magnetic pole teeth 211 and the rotor magnet 12, so that the rotating portion 1 is caused to rotate about the central axis J.

The insulator 23 is a member made of a resin and arranged to provide electrical isolation between the stator core 21 and each coil 22. The insulator 23 is preferably, for example, defined by an upper insulator and a lower insulator arranged on separate axial sides of the stator core 21 to hold the stator core 21. The coils 22 are preferably wound around the respective magnetic pole teeth 211 of the stator core 21 with the insulator intervening therebetween, so that the insulator 23 is fixed to the stator core 21.

The upper bracket 3 is preferably a metallic member press fitted and fixed to the stator 2, and arranged to hold the upper bearing 5. The upper bracket 3 is preferably, for example, obtained by subjecting a metal sheet, such as a zinc-plated steel sheet, to press working. The upper bracket 3 preferably includes an upper cylindrical cover 31, a top plate portion 32, and an upper bearing holding portion 33.

The upper cylindrical cover 31 is preferably cylindrical in shape, and includes the top plate portion 32 arranged at an upper end and an opening at a lower end. The upper cylindrical cover 31 is press fitted to an outer circumference of the stator core 21 from above, and is thus fixed to the stator core 21. An inner circumferential surface of the upper cylindrical cover 31 preferably includes, at a lower end thereof, a tapered portion 31s which is radially angled. The diameter of the tapered portion 31s is arranged to increase toward a lower end 31e of the upper cylindrical cover 31. This contributes to preventing an outer circumferential surface of the stator core 21 from being damaged when an upper end of the stator core 21 is press fitted into the upper cylindrical cover 31.

The top plate portion 32 is preferably a plate-shaped or substantially plate-shaped body arranged to extend radially inward from the upper end of the upper cylindrical cover 31 to reach a lower end of the upper bearing holding portion 33. That is, the top plate portion 32 is in the shape of an annular plate, and is arranged to surround the upper bearing holding portion 33. In addition, the top plate portion 32 preferably includes a connector opening portion 32h and a recessed portion 32c.

The connector opening portion 32h is an opening arranged to expose a connector 8c. The recessed portion 32c is a recess defined at an inner circumferential edge of the top plate portion 32. The recessed portion 32c is configured to lower an inner circumferential end of the top plate portion 32. This contributes to arranging the upper bearing holding portion 33 closer to the stator 2. Arranging the upper bearing holding portion 33 closer to the stator 2 makes it possible to increase an extent to which the upper bearing 5 is inserted into the upper bearing holding portion 33 while reducing the axial dimension of the motor 100. This contributes to improving precision in attachment of the upper bearing 5, and then improving precision in alignment of the shaft 10. Note that the recessed portion 32c may be omitted if so desired.

The upper bearing holding portion 33 is preferably in the shape of a covered cylinder, and includes an upper cylindrical portion 34 arranged to extend in the axial direction, and an upper cover portion 35 arranged to cover an upper surface of an outer race 53 of the upper bearing 5. The upper bearing holding portion 33 is arranged to hold the upper bearing 5.

The upper cylindrical portion 34 is cylindrical or substantially cylindrical in shape, and is arranged to extend upward from the inner circumferential end of the top plate portion 32. The upper bearing 5 is inserted into the upper bearing holding portion 33 through an opening defined at a lower end of the upper cylindrical portion 34. The outer race 53 of the upper bearing 5 is preferably loosely fitted in the upper cylindrical portion 34, and is held by an inner circumferential surface of the upper cylindrical portion 34 such that the outer race 53 is movable in the axial direction. Note that the outer race 53 of the upper bearing 5 may be arranged in any of a variety of manners so long as the outer race 53 is restrained from radial movement. For example, a portion of the outer race may be arranged to project downward below the upper cylindrical portion 34 as illustrated in FIG. 4.

The upper cover portion 35 is preferably a plate-shaped or substantially plate-shaped body arranged to extend radially inward from an upper end of the upper cylindrical portion 34. The upper cover portion 35 preferably includes a shaft hole 35h suitable to permit the shaft 10 to be positioned therein. That is, the upper cover portion 35 is preferably in the shape of an annular plate, and is arranged to surround the shaft hole 35h and cover the upper surface of the outer race 53 of the upper bearing 5.

The lower bracket 4 is preferably a metallic member press fitted and fixed to the stator 2 and arranged to hold the lower bearing 6. The lower bracket 4 is preferably, for example, obtained by subjecting an aluminum sheet to press working. The lower bracket 4 preferably includes a lower cylindrical cover 41, a bottom plate portion 42, and a lower bearing holding portion 43.

The lower cylindrical cover 41 is preferably cylindrical or substantially cylindrical in shape, and has the bottom plate portion 42 arranged at a lower end and an opening at an upper end. The lower cylindrical cover 41 is preferably press fitted to the outer circumference of the stator core 21 from below, and is thus fixed to the stator core 21. An inner circumferential surface of the lower cylindrical cover 41 includes, at an upper end thereof, a tapered portion 41s which is radially angled. The diameter of the tapered portion 41s is arranged to increase toward an upper end 41e of the lower cylindrical cover 41. This contributes to preventing the outer circumferential surface of the stator core 21 from being damaged when a lower end of the stator core 21 is press fitted into the lower cylindrical cover 41.

A positioning portion 41a is preferably arranged to determine an extent to which the stator core 21 is press fitted into the lower bracket 4. The positioning portion 41a is preferably provided as a circumferentially extending shoulder defined in the lower cylindrical cover 41. The inside diameter of the lower cylindrical cover 41 changes at the positioning portion 41a, and the inside diameter of the lower cylindrical cover 41 is greater above the positioning portion 41a than below the positioning portion 41a. Therefore, it is possible to press fit the stator core 21 into the lower bracket 4 to a predetermined extent by press fitting the stator core 21 into the lower bracket 4 until a lower end of the outer circumference of the stator core 21 contacts the positioning portion 41a.

Note that the positioning portion 41a may be omitted if so desired. Also note that positioning of the stator 2 with respect to the lower bracket 4 may alternatively be accomplished by arranging the insulator 23 to be in contact with the positioning portion 41a. However, the positioning is accomplished with greater precision when the stator core 21 is arranged to be in contact with the positioning portion 41a without the insulator 23 intervening therebetween.

The bottom plate portion 42 is preferably a plate-shaped or substantially plate-shaped body arranged to extend radially inward from a lower end of the lower cylindrical cover 41 to reach an upper end of the lower bearing holding portion 43. That is, the bottom plate portion 42 is in the shape of an annular plate, and is arranged to surround the lower bearing holding portion 43. A lower end surface of the bottom plate portion 42 is preferably used as an attachment surface to attach the motor 100 to the drive apparatus (not shown), and the bottom plate portion 42 preferably includes a plurality of attachment holes 42h.

The lower bearing holding portion 43 preferably includes a bottom, is cylindrical in shape, and includes a lower cylindrical portion 44 arranged to extend in the axial direction and a lower cover portion 45 arranged to cover a lower surface of an outer race 63 of the lower bearing 6. The lower bearing holding portion 43 is arranged to hold the lower bearing 6.

The lower cylindrical portion 44 is preferably cylindrical or substantially cylindrical in shape, and is arranged to extend downward from an inner circumferential end of the bottom plate portion 42. The lower bearing 6 is preferably inserted into the lower bearing holding portion 43 through an opening defined at an upper end of the lower cylindrical portion 44. The outer race 63 of the lower bearing 6 is preferably loosely fitted in the lower cylindrical portion 44. The outer race 63 of the lower bearing 6 is held by an inner circumferential surface of the lower cylindrical portion 44 such that the outer race 63 is movable in the axial direction. Note that the outer race 63 of the lower bearing 6 may be arranged in any of a variety of manners so long as the outer race 63 is restrained from radial movement. For example, a portion of the outer race 63 may be arranged to project upward above the lower cylindrical portion 44 as illustrated in FIG. 4.

The lower cover portion 45 is preferably a plate-shaped or substantially plate-shaped body arranged to extend radially inward from a lower end of the lower cylindrical portion 44. The lower cover portion 45 includes a shaft hole 45*h* suitable to the house the shaft 10 therein. That is, the lower cover portion 45 is preferably in the shape of an annular plate, and is arranged to surround the shaft hole 45*h*. The outer race 63 of the lower bearing 6 is arranged axially opposite the lower cover portion 45. An inner race 61 of the lower bearing 6 is preferably arranged axially opposite the shaft hole 45*h*. Accordingly, when an axially upward force is applied to the lower bracket 4, the outer race 63 of the lower bearing 6 contacts the lower cover portion 45 while the inner race 61 of the lower bearing 6 does not contact the lower cover portion 45.

The upper bearing 5 is a member arranged to rotatably support the shaft 10 on an upper side of the rotor magnet 12. The upper bearing 5 includes an inner race 51, the outer race 53, and two or more rolling elements 52 held between the inner and outer races 51 and 53. The inner race 51 of the upper bearing 5 is preferably fixed to the shaft 10 through press fit. The outer race 53 of the upper bearing 5 is preferably loosely fitted to the upper bearing holding portion 33, and is held to be movable in the axial direction.

The lower bearing 6 is a member arranged to rotatably support the shaft 10 on a lower side of the rotor magnet 12. The lower bearing 6 includes the inner race 61, the outer race 63, and two or more rolling elements 62 held between the inner and outer races 61 and 63. The inner race 61 of the lower bearing 6 is preferably fixed to the shaft 10 through press fit. The outer race 63 of the lower bearing 6 is preferably loosely fitted to the lower bearing holding portion 43, and is held to be movable in the axial direction.

The preload member 7 is an elastic member arranged to apply a preload to each of the upper and lower bearings 5 and 6. A wave washer, for example, is preferably used as the preload member 7. The preload member 7 is arranged axially adjacent to the outer race 53 of the upper bearing 5 to apply the preload to each of the upper and lower bearings 5 and 6.

The preload member 7 is arranged between the outer race 53 of the upper bearing 5 and the upper cover portion 35 of the upper bracket 3. The preload member 7 exerts an axially downward force to the outer race 53. At this time, a reaction force of this axially downward force acts on the upper cover portion 35 of the upper bracket 3. Both the upper and lower brackets 3 and 4 are fixed to the stator core 21. Accordingly, because of the above reaction force, an axially upward force is applied to the lower cover portion 45 of the lower bracket 4, and the lower cover portion 45 applies an axially upward force to the outer race 63 of the lower bearing 6.

That is, the preload member 7 applies the forces of the same strength to the outer race 53 of the upper bearing 5 in an axially downward direction and to the outer race 63 of the lower bearing 6 in an axially upward direction. Meanwhile, both the inner race 51 of the upper bearing 5 and the inner race 61 of the lower bearing 6 are fixed to the shaft 10. Therefore, the force exerted by the preload member 7 is a preload applied to each of the upper and lower bearings 5 and 6.

The strength of the force exerted by the preload member 7 is determined by the distance between the upper and lower cover portions 35 and 45. Therefore, the strength of the force exerted by the preload member 7 increases as the distance between the upper and lower cover portions 35 and 45 decreases, and decreases as the distance between the upper and lower cover portions 35 and 45 increases. Accordingly, the preload applied to each of the upper and lower bearings 5 and 6 has a value in accordance with the relative distance between the upper and lower brackets 3 and 4, and it is possible to adjust the strength of the preload in an operation of press fitting the upper and lower brackets 3 and 4 to the stator 2.

The circuit board 8 is preferably a board on which an electronic circuit arranged to supply the drive currents to the coils 22 is mounted. The circuit board 8 is fixed by the insulator 23. The circuit board 8 is preferably in or substantially in the shape of a disk, and includes a through hole 8*h* suitable to house the shaft 10 therein. In addition, a magnetic sensor 8*s* is preferably mounted on a lower surface of the circuit board 8, while the connector 8*c* is mounted on an upper surface of the circuit board 8.

It is possible to fit the rotating portion 1, with the upper bearing 5 press fitted and fixed to the shaft 10, to the lower bracket 4 with the stator 2 fitted thereto. The through hole 8*h* is arranged to have a diameter greater than an outside diameter of the upper bearing 5. At this time, the circuit board 8 is preferably fixed to the insulator 23 after passing by the upper bearing 5.

The magnetic sensor 8*s* is a sensor arranged to detect a rotational position of the rotor magnet 12. The magnetic sensor 8*s* is arranged opposite to an upper end of the rotor magnet 12. A Hall element, for example, is preferably used as the magnetic sensor 8*s*.

The connector 8*c* is a member used to connect the circuit board 8 with an external device such that the external device is capable of being disconnected from the circuit board 8. The connector 8*c* is preferably arranged to be opposed to the connector opening portion 32*h* of the upper bracket 3. Power is supplied from an external power source to the circuit board 8 through the connector 8*c*. In addition, a result of detection by the magnetic sensor 8*s* is outputted to an outside through the connector 8*c*.

Various components of the motor 100 according to the present preferred embodiment have been described above. Hereinafter, relationships between some of these components and action and effects of these relationships will be described in detail.

In the motor 100 according to the present preferred embodiment, the stator core 21 and each of the upper and lower brackets 3 and 4 are preferably fixed to each other through press fitting. More specifically, the upper bracket 3 with the upper bearing 5 held is press fitted to the outer circumference of the stator core 21 from above, while the lower bracket 4 with the lower bearing 6 held is press fitted to the outer circumference of the stator core 21 from below.

Adoption of the above-described arrangement allows the stator 2 and each of the upper and lower brackets 3 and 4 to be fixed to each other to define a united body with the stator core 21 held between the upper and lower brackets 3 and 4. Thus, it is possible to use the same upper and lower brackets 3 and 4 for comparable motors whose stator cores have different axial dimensions from the axial dimension of the stator core 21 of the motor 100.

In the case of known motors whose stators are entirely covered with brackets, it is necessary to use different brackets having different shapes or sizes in accordance with the axial dimensions of the respective stators. This poses a problem in that the same brackets cannot be used for different motors having different desired characteristics, such as power and torque.

In contrast, in the case of the motor 100 according to the present preferred embodiment, it is possible to use the same upper and lower brackets 3 and 4 for the comparable motors whose stator cores have different axial dimensions from the axial dimension of the stator core 21 of the motor 100. In particular, in the case where the stator core 21 of the motor 100 and the stator cores of the comparable motors are each defined by laminated magnetic steel sheets, each of which has the same outside diameter, it is possible to use the same upper and lower brackets 3 and 4 in common even if, for example, the magnetic steel sheets have different thicknesses or the number of magnetic steel sheets defining the stator core of each comparable motor is different from the number of magnetic steel sheets defining the stator core 21 of the motor 100. The shared use of the parts leads to a reduction in production costs of the motor 100 and the comparable motors. Thus, it is possible to provide the motor 100 and a variety of comparable motors having different desired characteristics at reduced costs.

Meanwhile, in the case of a known motor described in JP-A 11-220860, a stator is held between two brackets, and a fixing screw passing through the stator is used to fasten the brackets. This known motor has a problem in that the fixing screw is necessary to fasten the brackets and this results in an increase in the number of parts. In addition, the known motor has a problem in that fixing screws having different lengths should be used depending on the axial dimension of the stator. Furthermore, the known motor has a problem in that a space in which the fixing screw is inserted should be secured in the stator, and this leads to deterioration in magnetic properties of a stator core and a decrease in efficiency of the motor.

In contrast, the motor 100 according to the present preferred embodiment does not require any fixing screws because the stator core 21 and each of the upper and lower brackets 3 and 4 are preferably fixed to each other through press fitting, such that a reduction in the number of parts is achieved. Moreover, in the case of the motor 100 according to the present preferred embodiment, it is not necessary to secure the space in which the fixing screw is inserted, and this prevents deterioration in magnetic properties of the stator core 21, and achieves an improvement in an energy efficiency of the motor 100.

Moreover, the upper and lower brackets 3 and 4 are spaced away from each other. That is, a lower end of the upper bracket 3 and an upper end of the lower bracket 4 are preferably arranged axially opposite each other with a gap intervening therebetween, and a portion of an outer circumferential surface of the stator 2 is exposed through this gap. This allows efficient dispersion of heat from the stator 2, and leads to an additional improvement in the efficiency of the motor.

The motor 100 according to the present preferred embodiment has a structure described below. Both the inner races 51 and 61 of the upper and lower bearings 5 and 6, respectively, are fixed to the shaft 10. The upper bracket 3 is arranged to include the upper bearing holding portion 33, which is in the shape of a covered cylinder, to hold the outer race 53 of the upper bearing 5 such that the outer race 53 is movable in the axial direction. The lower bracket 4 is arranged to include the lower bearing holding portion 43, which has the bottom and is cylindrical in shape, to hold the outer race 63 of the lower bearing 6 such that the outer race 63 is movable in the axial direction. The preload member 7 is arranged between the upper cover portion 35 of the upper bearing holding portion 33 and the outer race 53 of the upper bearing 5.

The above structure enables a preload in accordance with the relative distance between the upper and lower brackets 3 and 4 to be applied to each of the upper and lower bearings 5 and 6. It is possible to adjust the relative distance between the upper and lower brackets 3 and 4 when the stator core 21 is press fitted to the upper bracket 3 or when the stator core 21 is press fitted to the lower bracket 4. Therefore, it is possible to adjust the preload applied to each of the upper and lower bearings 5 and 6 at the time of assemblage so that a desired preload is applied to each of the upper and lower bearings 5 and 6.

In the case of the known motor described in JP-A 11-220860, the relative distance between the brackets is determined by the axial dimension of the stator, and the known motor therefore has a problem in that an error in the axial dimension of the stator affects preloads applied to upper and lower bearings. In particular, in the case where the stator core is defined by laminated magnetic steel sheets, errors in the thickness of the respective magnetic steel sheets are accumulated to easily cause a significant error in the axial dimension of the stator core, and it is difficult to apply an appropriate preload to each of the upper and lower bearings.

In contrast, in the case of the motor 100 according to the present preferred embodiment, the stator core 21 and each of the upper and lower brackets 3 and 4 are fixed to each other through press fitting, and it is therefore possible to adjust the relative distance between the upper and lower brackets 3 and 4 at the time of the press fitting. Therefore, even if an error in the shape of the stator 2 has occurred because of, for example, a manufacturing variation or the like, it is still possible to apply an appropriate preload to each of the upper and lower bearings 5 and 6. Accordingly, a reduction in occurrence of vibrations and noise when the motor 100 is running is achieved while an improvement in durability of the motor 100 is achieved.

The motor 100 according to the present preferred embodiment is preferably arranged such that the extent to which the upper bearing 5 is inserted into the upper bearing holding portion 33 of the upper bracket 3 is equal to or greater than the extent to which the stator core 21 is press fitted into the upper cylindrical cover 31 of the upper bracket 3.

The above arrangement prevents the press fitting of the stator core 21 into the upper cylindrical cover 31 from starting before start of the insertion of the upper bearing 5 into the upper bearing holding portion 33 when the upper bracket 3 is fitted to the rotating portion 1 and the stator 2 after the lower bracket 4 is fitted to the rotating portion 1 and the stator 2.

In the case where the press fitting of the stator core into the upper cylindrical cover 31 is first started, and then the insertion of the upper bearing 5 into the upper bearing holding portion 33 is started, the upper bearing 5, which is arranged in an inclined state, may be inserted into the upper bearing holding portion 33. If this happens, the precision of the alignment of the shaft 10 may be reduced. Accordingly, the extent to which the upper bearing 5 is inserted into the upper bearing holding portion 33 may be arranged to be equal to or greater than the extent to which the stator core 21 is press fitted into the upper cylindrical cover 31. This arrangement enables the insertion of the upper bearing 5 to start first. This makes it possible to fix the upper bracket 3 to the stator 2 while aligning an axis of the upper bearing 5 and an axis of the lower bearing 6 with each other. This results in an improvement in the precision in the attachment of the upper bearing 5, and an improvement in the precision in the alignment of the shaft 10.

It is particularly preferable that the extent to which the upper bearing 5 is inserted into the upper bearing holding portion 33 of the upper bracket 3 should be equal or substantially equal to the extent to which the stator core 21 is press fitted into the upper cylindrical cover 31 of the upper bracket 3. An increase in the extent to which the stator core 21 is press fitted into the upper cylindrical cover 31 leads to an increase in strength with which the upper bracket 3 is fastened to the stator 2. Therefore, when the extent of the insertion of the upper bearing 5 and the extent of the press fitting of the stator core 21 into the upper bracket 3 are arranged to be equal or substantially equal to each other, both an improvement in the precision in the alignment of the shaft 10 and an improvement in the strength with which the upper bracket 3 is fastened to the stator 2 are achieved at the same time.

The motor 100 according to the present preferred embodiment is preferably arranged such that the extent to which the stator core 21 is press fitted into the lower cylindrical cover 41 of the lower bracket 4 is greater than the extent to which the stator core 21 is press fitted into the upper cylindrical cover 31 of the upper bracket 3. This arrangement leads to an improvement in strength with which the lower bracket 4 is fastened to the stator 2.

An increase in the extent to which the stator core 21 is press fitted into the lower cylindrical cover 41 of the lower bracket 4 leads to an increase in the strength with which the lower bracket 4 is fastened to the stator 2. While the extent to which the stator core 21 is press fitted into the upper bracket 3 has a constraint from the viewpoint of the precision in the alignment of the shaft 10 as mentioned above, the extent to which the stator core 21 is press fitted into the lower bracket 4 does not have such a constraint. Accordingly, the extent to which the stator core 21 is press fitted into the lower bracket 4 is arranged to be greater than the extent to which the stator core 21 is press fitted into the upper bracket 3 to improve the strength with which the lower bracket 4 is fastened to the stator 2. This arrangement is particularly suitable when the lower end portion of the shaft 10 serves as the output shaft, and a greater load is applied to the lower bracket 4 than to the upper bracket 3.

In addition, in the motor 100 according to the present preferred embodiment, the positioning portion 41a, which is arranged to determine the extent to which the stator core 21 is press fitted into the lower bracket 4, is included in the lower cylindrical cover 41 of the lower bracket 4, and the lower end of the outer circumference of the stator core 21 is arranged to be in contact with the positioning portion 41a. This makes it possible to fix the extent to which the stator core 21 is press fitted into the lower cylindrical cover 41.

Fixing the extent to which the stator core 21 is press fitted into the lower cylindrical cover 41 of the lower bracket 4 makes it possible to fasten the lower bracket 4 to the stator 2 with a fixed strength. When the stator core 21 is not press fitted into the lower bracket 4 to a sufficient extent, the stator 2 is positioned in an elevated state with respect to the rotating portion 1. In this case, when the upper bracket 3 is fitted to the rotating portion 1 and the stator 2, the press fitting of the stator core 21 starts before the start of the insertion of the upper bearing 5. Accordingly, the positioning portion 41a is arranged in the lower cylindrical cover 41 to fix the extent to which the stator core 21 is press fitted into the lower bracket 4 so that the precision in the alignment of the shaft 10 is significantly improved.

An extent to which the lower bearing 6 is inserted into the lower bearing holding portion 43 is preferably arranged to be greater than the extent to which the upper bearing 5 is inserted into the upper bearing holding portion 33. In the case where the lower end portion of the shaft 10 serves as the output shaft, a greater load is applied to the lower bracket 4 than to the upper bracket 3. Accordingly, the extent of the insertion of the lower bearing 6 is increased to reduce a deterioration (caused by, for example, aging) in accuracy of an axis of the shaft 10 and to improve the durability of the motor 100.

Second Preferred Embodiment

In the first preferred embodiment of the present invention, the extent of the press fitting of the lower bracket 4 is fixed preferably by arranging the lower end of the stator core 21 to contact the positioning portion 41a. In contrast, in a second preferred embodiment of the present invention, an extent of press fitting of a lower bracket 4 is fixed by another method. Note that redundant descriptions about components of a motor 101 according to the second preferred embodiment which have their equivalents in the motor 100 according to the above-described preferred embodiment are omitted.

Figure 5:
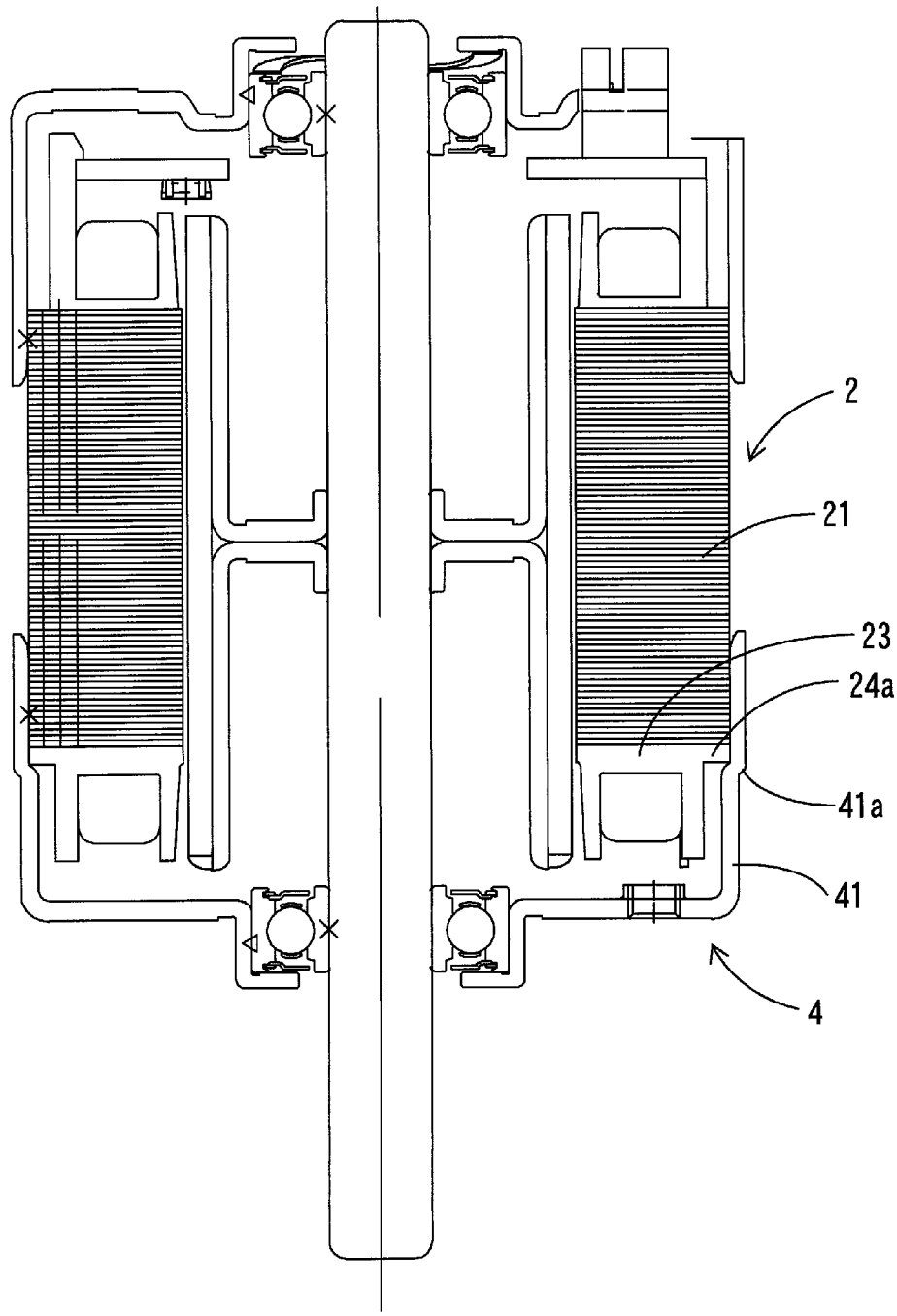
FIG. 5 is a cross-sectional view illustrating an exemplary structure of a motor 101 according to a second preferred embodiment of the present invention.

FIG. 5 is a cross-sectional view illustrating an exemplary structure of the motor 101 according to the second preferred embodiment of the present invention. A contact portion 24a illustrated in FIG. 5 is a preferably portion of an insulator 23 arranged to project radially outward. The contact portion 24a is arranged to have an outside diameter equal or substantially equal to an outside diameter of a stator core 21, and an outer circumferential surface of the contact portion 24a is arranged under an outer circumferential surface of the stator core 21.

Once a stator 2 is press fitted into the lower bracket 4, a lower end of an outer circumference of the contact portion 24a contacts a positioning portion 41a of a lower cylindrical cover 41. This makes it possible to position the lower bracket 4 with respect to the stator 2, and to press fit the stator core 21 into the lower bracket 4 to a predetermined extent. That is, the extent to which the stator core 21 is press fitted into the lower bracket 4 is fixed by arranging the insulator 23 to contact the positioning portion 41a instead of arranging the stator core 21 to contact the positioning portion 41a.

Figure 6:
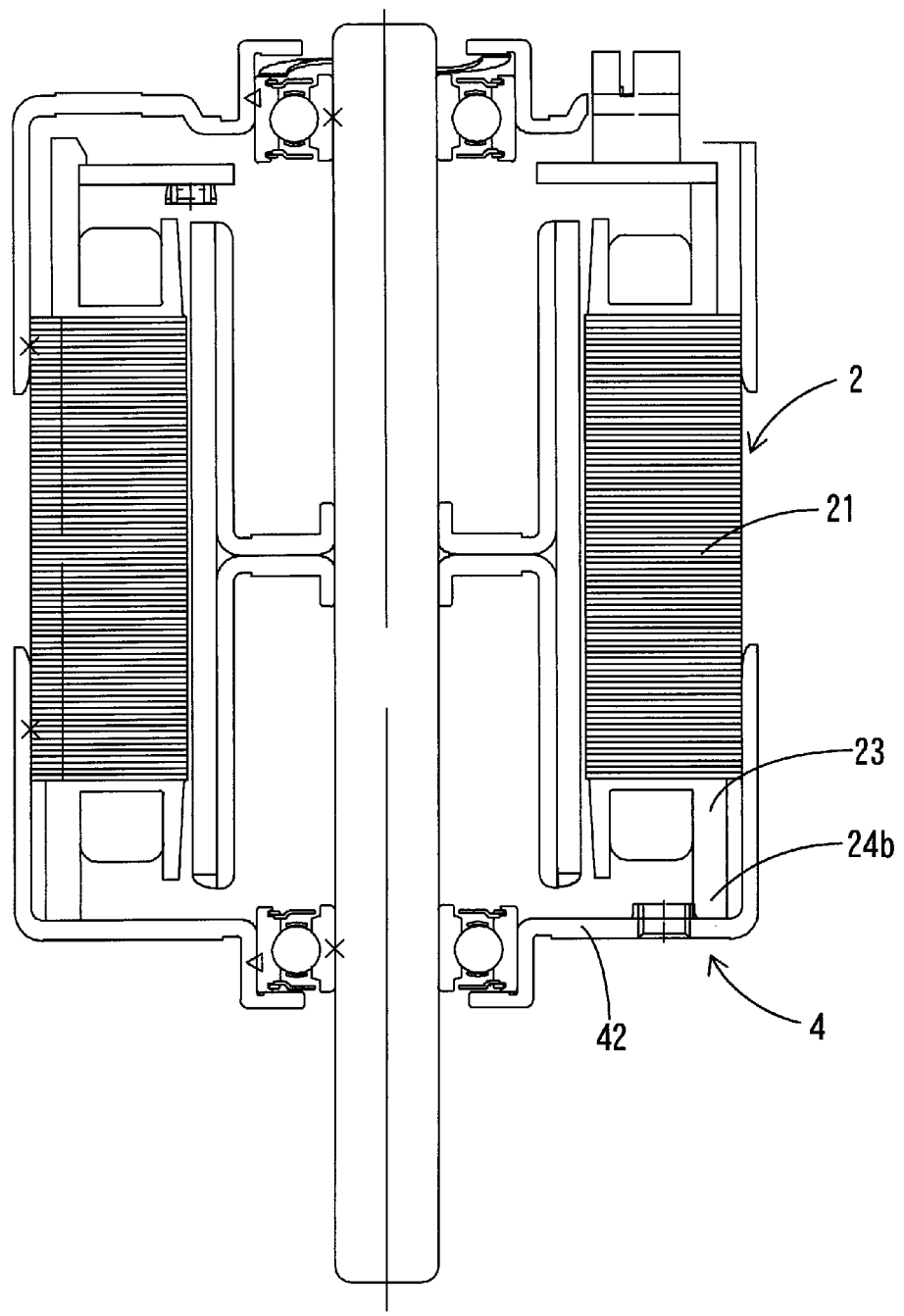
FIG. 6 is a cross-sectional view illustrating an exemplary structure of a motor 102 according to a modification of the second preferred embodiment of the present invention.

FIG. 6 is a cross-sectional view illustrating an exemplary structure of a motor 102 according to a modification of the second preferred embodiment of the present invention. A contact portion 24b illustrated in FIG. 6 is a portion of a stator 2 which is arranged to be in contact with a bottom plate portion 42 of a lower bracket 4. This contact portion 24b is preferably a portion of an insulator 23 which is arranged to project downward. Note that the contact portion 24b may be a portion of a stator core 21 which is arranged to project downward.

Once the stator 2 is press fitted into the lower bracket 4, a lower end of the contact portion 24b contacts the bottom plate portion 42 of the lower bracket 4. This makes it possible to position the lower bracket 4 with respect to the stator 2, and to press fit the stator core 21 into the lower bracket 4 to a predetermined extent. That is, the extent to which the stator core 21 is press fitted into the lower bracket 4 is fixed by arranging the contact portion 24b to contact the bottom plate portion 42 instead of by using the positioning portion 41a.

Figure 7:
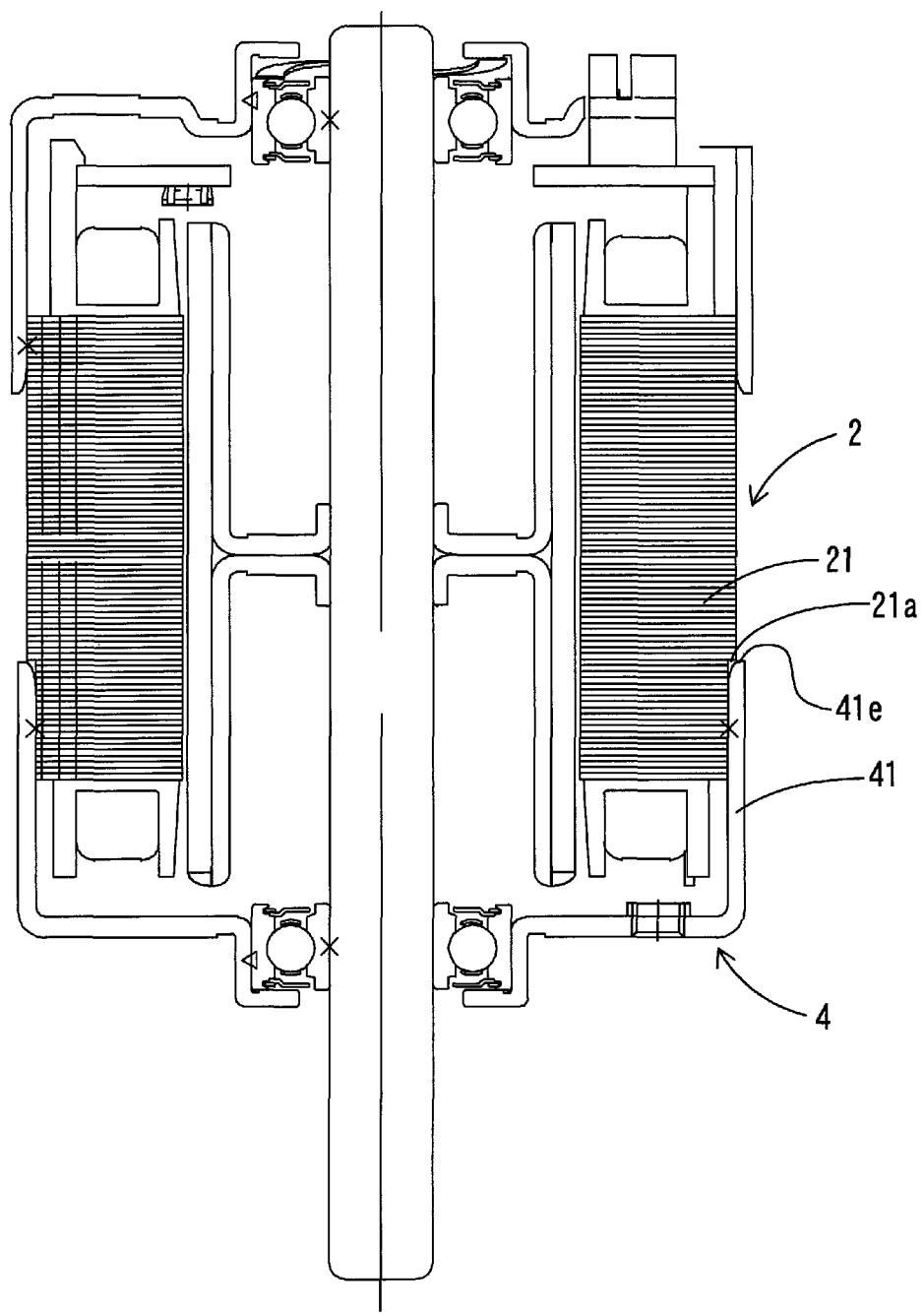
FIG. 7 is a cross-sectional view illustrating an exemplary structure of a motor 103 according to another modification of the second preferred embodiment of the present invention.

FIG. 7 is a cross-sectional view illustrating an exemplary structure of a motor 103 according to a modification of the second preferred embodiment of the present invention. The motor 103 preferably includes a positioning portion 21a, instead of the positioning portion 41a, as a portion arranged to determine an extent to which a stator core 21 is press fitted into a lower bracket 4.

The positioning portion 21a is preferably defined by a shoulder extending in the circumferential direction in an outer circumferential surface of the stator core 21. The outside diameter of the stator core 21 changes at the positioning portion 21a, and the outside diameter of the stator core 21 is greater above the positioning portion 21a than below the positioning portion 21a. Accordingly, it is possible to press fit the stator core 21 into the lower bracket 4 to a predetermined extent by press fitting the stator core 21 into the lower bracket 4 such that an upper end 41e of a lower cylindrical cover 41 of the lower bracket 4 contacts the positioning portion 21a.

Third Preferred Embodiment

In the first preferred embodiment, the preload member 7 preferably is adjacent to the upper bearing 5. In contrast, in a third preferred embodiment of the present invention, a preload member 7 is preferably adjacent to a lower bearing 6. Note that redundant descriptions about components of a motor 104 according to the third preferred embodiment which have their equivalents in any of the motors 100 to 103 according to the above-described preferred embodiments and the modifications thereof are omitted.

Figure 8:
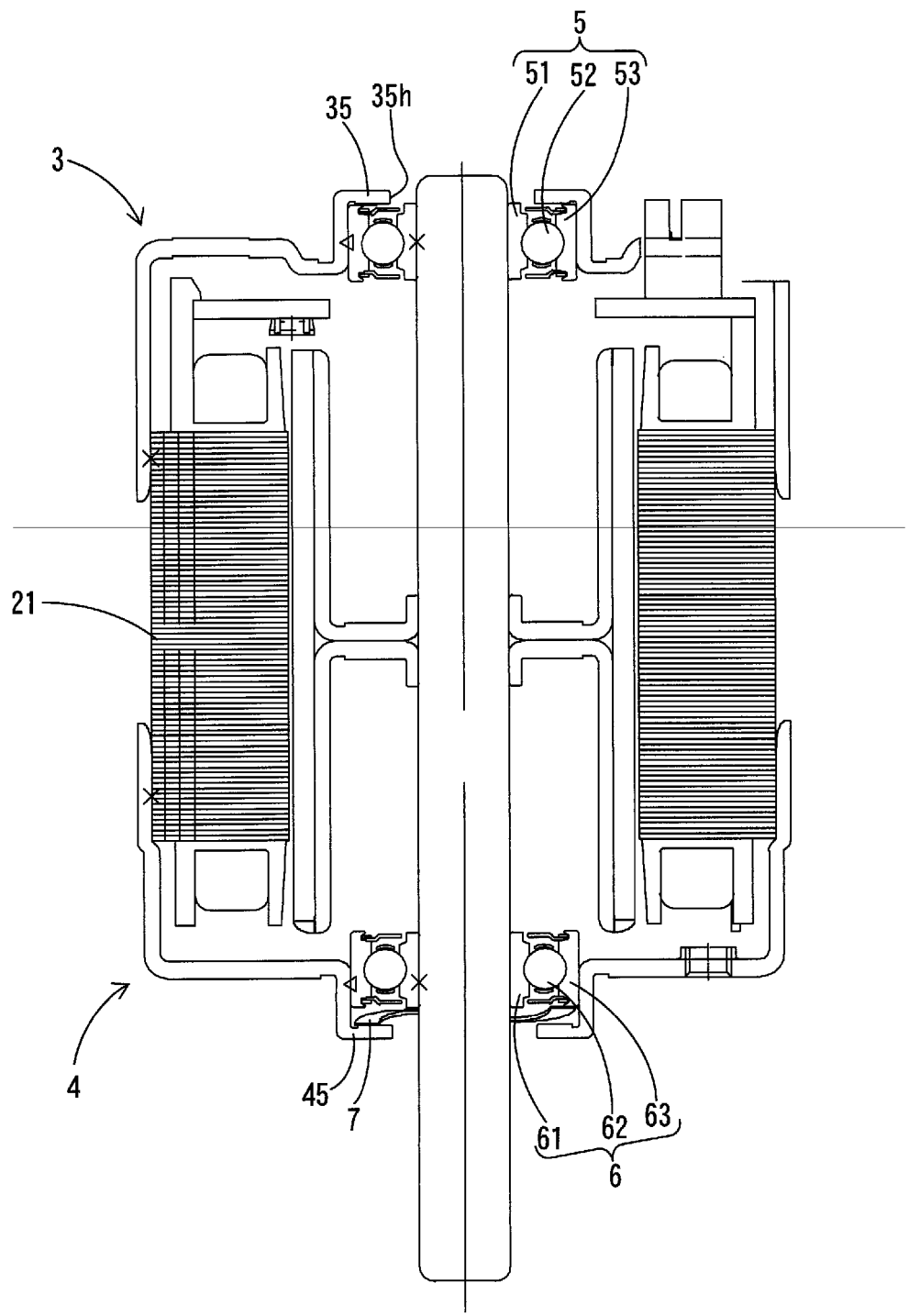
FIG. 8 is a cross-sectional view illustrating an exemplary structure of a motor 104 according to a third preferred embodiment of the present invention.

FIG. 8 is a cross-sectional view illustrating an exemplary structure of the motor 104 according to the third preferred embodiment of the present invention. The preload member 7 illustrated in FIG. 8 is preferably an elastic member arranged axially adjacent to an outer race 63 of the lower bearing 6 to apply a preload to each of an upper bearing 5 and the lower bearing 6. A wave washer, for example, is preferably used as the preload member 7.

The preload member 7 is arranged between the outer race 63 of the lower bearing 6 and a lower cover portion 45 of a lower bracket 4 to exert an axially upward force to the outer race 63. At this time, a reaction force of this axially upward force acts on the lower cover portion 45 of the lower bracket 4. Both an upper bracket 3 and the lower bracket 4 are fixed to a stator core 21. Accordingly, because of the above reaction force, an axially downward force is applied to an upper cover portion of the upper bracket 3, and the upper cover portion 35 applies an axially downward force to an outer race 53 of the upper bearing 5.

That is, the preload member 7 may be arranged adjacent to the lower bearing 6 instead of adjacent to the upper bearing 5. Note that, as in the case of the motor 100 according to the first preferred embodiment illustrated in FIG. 4, the force exerted by the preload member 7 is a preload applied to each of the upper and lower bearings 5 and 6, and the preload applied to each of the upper and lower bearings 5 and 6 has a value in accordance with the relative distance between the upper and lower brackets 3 and 4.

Note that the outer race 53 of the upper bearing 5 is arranged axially opposite the upper cover portion 35, while an inner race 51 of the upper bearing 5 is arranged axially opposite a shaft hole 35h. Accordingly, when an axially downward force is applied to the upper bracket 3, the outer race 53 of the upper bearing 5 contacts the upper cover portion 35 while the inner race 51 of the upper bearing 5 does not contact the upper cover portion 35.

Fourth Preferred Embodiment

In the first preferred embodiment, the upper bearing holding portion 33 is arranged on an upper side of the top plate portion 32. In contrast, in a fourth preferred embodiment of the present invention, an upper bearing holding portion 33 is preferably arranged on a lower side of a top plate portion 32. Note that redundant descriptions about components of a motor 105 according to the fourth preferred embodiment which have their equivalents in any of the motors 100 to 104 according to the above-described preferred embodiments and the modifications thereof are omitted.

Figure 9:
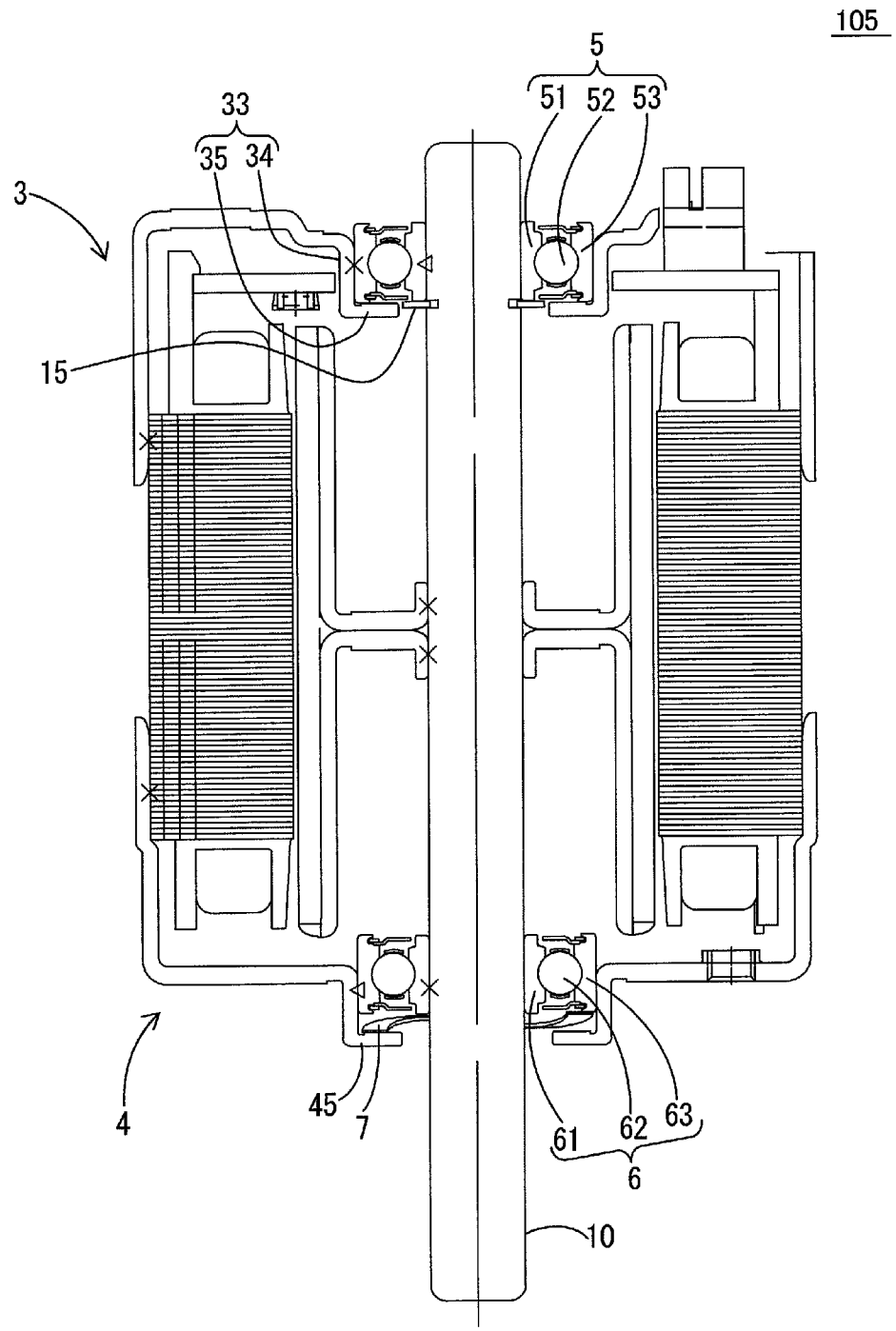
FIG. 9 is a cross-sectional view illustrating an exemplary structure of a motor 105 according to a fourth preferred embodiment of the present invention.

FIG. 9 is a cross-sectional view illustrating an exemplary structure of the motor 105 according to the fourth preferred embodiment of the present invention. The motor 105 is different from the motor 104 according to the third preferred embodiment illustrated in FIG. 8 in the shape of the upper bearing holding portion 33 and a manner of holding an upper bearing 5, and in that a stopper 15 is preferably provided in the motor 105.

The upper bearing holding portion 33 has a bottom and is cylindrical in shape, and includes an upper cylindrical portion 34 arranged to extend in the axial direction, and an upper cover portion 35 arranged to cover a lower surface of an outer race 53 of the upper bearing 5. The upper bearing holding portion 33 is arranged to hold the upper bearing 5. The upper cylindrical portion 34 is preferably cylindrical or substantially cylindrical in shape, and is arranged to extend downward from an inner circumferential end of the top plate portion 32. The upper bearing 5 is preferably inserted into the upper bearing holding portion 33 through an opening arranged at an upper end of the upper cylindrical portion 34. The upper cover portion 35 is a preferably a plate-shaped or substantially plate-shaped body arranged to extend radially inward from a lower end of the upper cylindrical portion 34, and includes a shaft hole 35h suitable to house the shaft 10 therein.

The stopper 15 is preferably fixed to the shaft 10 on a side of the upper bearing 5 closer to a rotor magnet 12, and is arranged to restrain an inner race 51 of the upper bearing 5 from moving axially downward. The stopper 15 is preferably, for example, defined by a flat or substantially flat annular plate, and is fitted into an annular groove defined in an outer circumferential surface of the shaft 10. The stopper 15 defines a portion of a rotating portion 1. Note that the stopper 15 is arranged axially opposite the inner race 51 of the upper bearing 5, but is not arranged axially opposite the outer race 53 of the upper bearing 5, and is arranged to restrain movement of only the inner race 51.

The outer race 53 of the upper bearing 5 is preferably press fitted and fixed to the upper bearing holding portion 33. The inner race 51 of the upper bearing 5 is preferably loosely fitted to the shaft 10, and is held such that the inner race 51 is movable in the axial direction, but is restrained by the stopper 15 from moving downward.

As in the case of the motor 104 according to the third preferred embodiment illustrated in FIG. 8, a preload member 7 is arranged between an outer race 63 of a lower bearing 6 and a lower cover portion 45 of a lower bracket 4 to exert an axially upward force to the outer race 63. At this time, a reaction force of this axially upward force acts on the lower cover portion 45 of the lower bracket 4, and an axially downward force is applied to the upper bearing holding portion 33 of the upper bracket 3. As a result, an axially downward force is also applied to the outer race 53 of the upper bearing 5 since the outer race 53 is fixed to the upper bearing holding portion 33.

That is, the preload member 7 applies the forces of the same strength to the outer race 63 of the lower bearing 6 in the axially upward direction and to the outer race 53 of the upper bearing 5 in the axially downward direction. Meanwhile, an inner race 61 of the lower bearing 6 is preferably fixed to the shaft 10, while the inner race 51 of the upper bearing 5 contacts the stopper 15 to be prevented from moving downward. Therefore, the force exerted by the preload member 7 is a preload applied to each of the upper and lower bearings 5 and 6. The preload has a value in accordance with the relative distance between an upper bracket 3 and the lower bracket 4.

Figure 10:
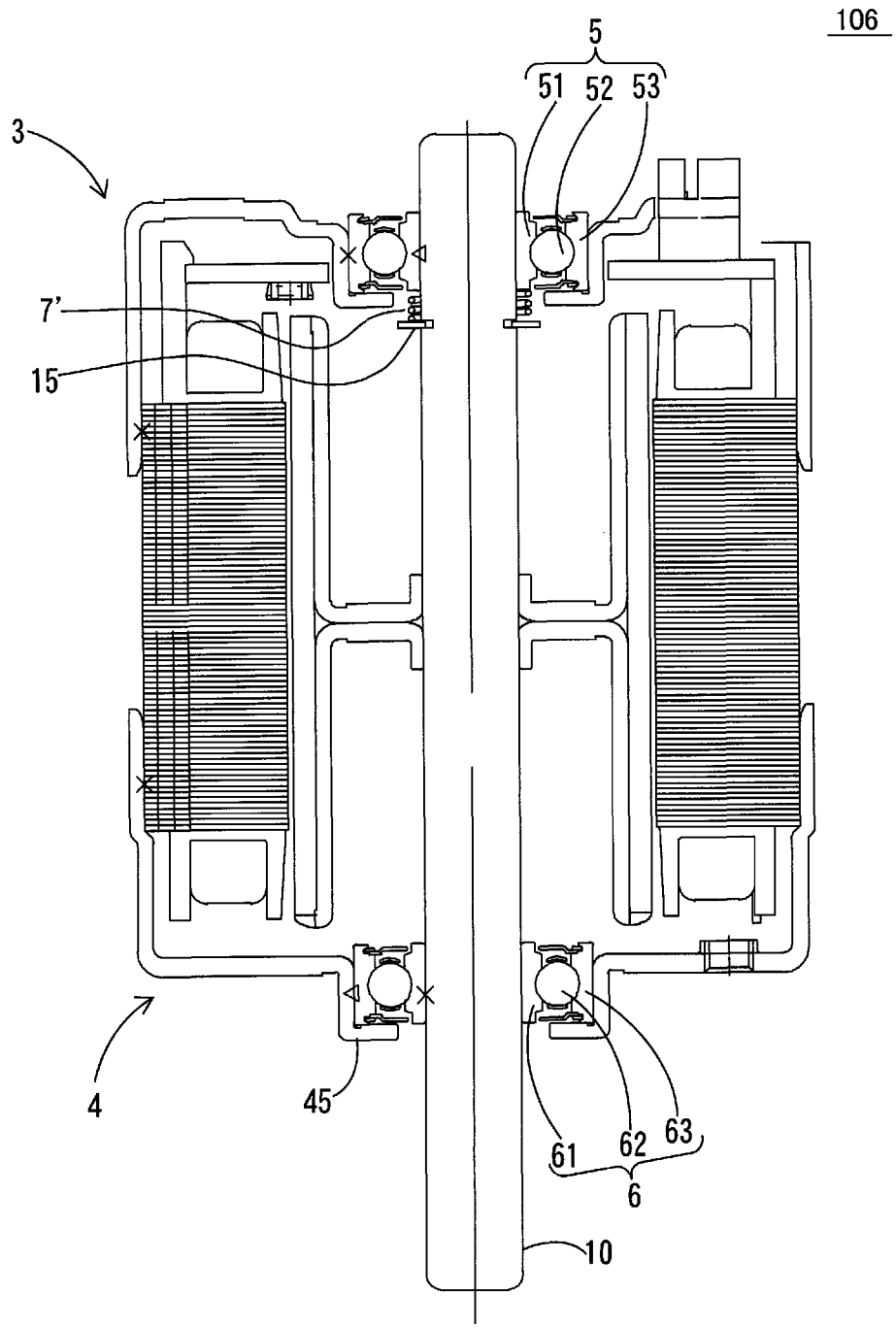
FIG. 10 is a cross-sectional view illustrating an exemplary structure of a motor 106 according to a modification of the fourth preferred embodiment.

FIG. 10 is a cross-sectional view illustrating an exemplary structure of a motor 106 according to a modification of the fourth preferred embodiment of the present invention. The motor 106 is different from the motor 105 illustrated in FIG. 9 in that a preload member 7' is preferably provided in place of the preload member 7.

The preload member 7' is preferably an elastic member arranged axially adjacent to an inner race 51 of an upper bearing 5 to apply a preload to each of the upper bearing 5 and a lower bearing 6. A coil spring, for example, is preferably used as the preload member 7'. The preload member 7' is arranged between the inner race 51 of the upper bearing 5 and a stopper 15, and is arranged to exert an axially upward force to the inner race 51. At this time, a reaction force of this axially upward force acts on the stopper 15. Since both the stopper 15 and an inner race 61 of the lower bearing 6 are fixed to a shaft 10, an axially downward force is applied to the inner race 61 of the lower bearing 6 because of the above reaction force.

That is, the preload member 7' applies the forces of the same strength to the inner race 51 of the upper bearing 5 in the axially upward direction and to the inner race 61 of the lower bearing 6 in the axially downward direction. Meanwhile, an outer race 53 of the upper bearing 5 is fixed to an upper bracket 3, while an outer race 63 of the lower bearing 6 is arranged to be in contact with a lower cover portion 45 to be prevented from moving downward relative to a lower bracket 4. Therefore, the force exerted by the preload member 7' is a preload applied to each of the upper and lower bearings 5 and 6. The preload has a value in accordance with the relative distance between the upper and lower brackets 3 and 4.

In each of the motors 105 and 106 according to the fourth preferred embodiment and the modification thereof, respectively, the upper bearing holding portion 33 is preferably arranged on the lower side of the top plate portion 32 of the upper bracket 3. This arrangement contributes to reducing the axial dimension of each of the motors 105 and 106 to achieve a reduction in size.

Note that, in each of the above-described preferred embodiments and the modifications thereof, the method of fixing each of the upper and lower brackets 3 and 4 to the stator 2 is not limited to press fitting but may be a combination of press fitting and adhesion or any other desirable fixing method. Also note that each of the upper and lower brackets 3 and 4 may alternatively be fixed to the stator 2 through, for example, welding. In short, each of the upper and lower brackets 3 and 4 may be fixed to the stator 2 by a variety of methods without use of a screw or the like, so long as the axial position of each of the upper and lower brackets 3 and 4 relative to the stator 2 can thereby be determined.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inner-rotor motor comprising:
   an upper bearing and a lower bearing;
   a shaft supported by the upper and lower bearings to be rotatable about a rotation axis extending in a vertical direction;
   a rotor magnet directly or indirectly fixed to the shaft;
   a stator arranged radially outside and opposite to the rotor magnet with a gap intervening therebetween;
   an upper bracket configured to hold the upper bearing; and
   a lower bracket configured to hold the lower bearing; wherein
   the stator includes a stator core, an insulator, and windings wound around the stator core with the insulator intervening therebetween;
   the upper bracket includes an upper cylindrical cover press fitted to an outer circumference of the stator core from above, an upper bearing holding portion extending in an axial direction and configured to hold the upper bearing, and a top plate portion configured to join the upper cylindrical cover and the upper bearing holding portion to each other;
   the lower bracket includes a lower cylindrical cover press fitted to the outer circumference of the stator core from below, a lower bearing holding portion extending in the axial direction and configured to hold the lower bearing, and a bottom plate portion configured to join the lower cylindrical cover and the lower bearing holding portion to each other;
   each of the upper and lower brackets is press fitted to the stator core; and
   the inner-rotor motor further comprises a preload member axially adjacent to one of the upper and lower bearings to apply a preload in accordance with a relative distance between the upper and lower brackets to each of the upper and lower bearings, wherein each of the upper and lower bearings include an outer race, an inner race, and two or more rolling elements held between the inner and outer races.

2. The inner-rotor motor according to claim 1, wherein the upper bearing holding portion includes an upper cylindrical portion extending upward from the top plate portion of the upper bracket, and an upper cover portion extending radially inward from an upper end of the upper cylindrical portion;

both the inner race of the upper bearing and the inner race of the lower bearing are fixed to the shaft;

the outer race of the upper bearing and the outer race of the lower bearing are held to be movable in the axial direction with respect to the upper bracket and the lower bracket, respectively; and the preload member is arranged between the outer race of the upper bearing and the upper cover portion of the upper bracket.

3. The inner-rotor motor according to claim 2, wherein the top plate portion of the upper bracket includes a recessed portion arranged to lower an inner circumferential end of the top plate portion; and the upper cylindrical portion of the upper bearing holding portion extends upward from the inner circumferential end of the top plate portion of the upper bracket.

4. The inner-rotor motor according to claim 1, wherein the upper bearing holding portion includes an upper cylindrical portion extending upward from the top plate portion of the upper bracket, and an upper cover portion extending radially inward from an upper end of the upper cylindrical portion;

the lower bearing holding portion includes a lower cylindrical portion extending downward from the bottom plate portion of the lower bracket and a lower cover portion extending radially inward from a lower end of the lower cylindrical portion;

both the inner race of the upper bearing and the inner race of the lower bearing are fixed to the shaft;

the outer race of the upper bearing and the outer race of the lower bearing are held to be movable in the axial direction with respect to the upper bracket and the lower bracket, respectively; and the preload member is arranged between the outer race of the lower bearing and the lower cover portion of the lower bracket.

5. The inner-rotor motor according to claim 1, wherein the upper bearing is inserted in the upper bearing holding portion; and an extent to which the upper bearing is inserted into the upper bearing holding portion is equal to or greater than an extent to which the stator core is press fitted into the upper bracket.

6. The inner-rotor motor according to claim 5, wherein the extent to which the upper bearing is inserted into the upper bearing holding portion is equal or substantially equal to the extent to which the stator core is press fitted into the upper bracket.

7. The inner-rotor motor according to claim 5, wherein an extent to which the stator core is press fitted into the lower bracket is greater than the extent to which the stator core is press fitted into the upper bracket.

8. The inner-rotor motor according to claim 5, wherein the lower bracket includes, in the lower cylindrical cover, a positioning portion arranged to determine an extent to which the stator core is press fitted into the lower bracket; and the stator is press fitted to the lower bracket such that a lower end of an outer circumference of the stator is in contact with the positioning portion.

9. The inner-rotor motor according to claim 8, wherein the outer circumference of the stator is defined by the stator core.

10. The inner-rotor motor according to claim 5, wherein the stator includes, in an outer circumference thereof, a positioning portion arranged to determine an extent to which the stator core is press fitted into the lower bracket; and the lower bracket is press fitted to the stator core such that an upper end of the lower bracket is in contact with the positioning portion.

11. The inner-rotor motor according to claim 5, wherein the stator is press fitted to the lower bracket such that a lower end of the stator is in contact with the bottom plate portion of the lower bracket.

12. The inner-rotor motor according to claim 1, further comprising a stopper fixed to the shaft, wherein the upper bearing holding portion includes an upper cylindrical portion extending downward from the top plate portion of the upper bracket, and an upper cover portion extending radially inward from a lower end of the upper cylindrical portion;

the outer race of the upper bearing is fixed to the upper bearing holding portion;

the inner race of the upper bearing is supported to be movable in the axial direction with respect to the shaft;

the inner race of the lower bearing is fixed to the shaft;

the outer race of the lower bearing is held to be movable in the axial direction with respect to the lower bearing holding portion; and the preload member is arranged between the inner race of the upper bearing and the stopper.

13. The inner-rotor motor according to claim 1, wherein the upper bearing holding portion includes an upper cylindrical portion extending downward from the top plate portion of the upper bracket and an upper cover portion extending radially inward from a lower end of the upper cylindrical portion;

the lower bearing holding portion includes a lower cylindrical portion extending downward from the bottom plate portion of the lower bracket and a lower cover portion extending radially inward from a lower end of the lower cylindrical portion;

the outer race of the upper bearing is fixed to the upper bearing holding portion;

the inner race of the upper bearing is supported to be movable in the axial direction with respect to the shaft;

the inner race of the lower bearing is fixed to the shaft;

the outer race of the lower bearing is held to be movable in the axial direction with respect to the lower bearing holding portion; and the preload member is arranged between the outer race of the lower bearing and the lower cover portion of the lower bearing holding portion.

14. The inner-rotor motor according to claim 1, wherein the shaft includes a projecting portion projecting downward below the lower bracket and defining an output shaft.

15. The inner-rotor motor according to claim 14, wherein the lower bearing is inserted in the lower bearing holding portion;

the upper bearing is inserted in the upper bearing holding portion; and an extent to which the lower bearing is inserted into the lower bearing holding portion is greater than an extent to which the upper bearing is inserted into the upper bearing holding portion.

16. The inner-rotor motor according to claim 14, wherein an extent to which the stator is press fitted into the lower bracket is greater than an extent to which the stator is press fitted into the upper bracket.

17. The inner-rotor motor according to claim 1, wherein the upper bracket includes a tapered portion which is radially angled at a lower end of an inner circumferential surface of the upper cylindrical cover.

18. The inner-rotor motor according to claim 1, wherein a lower end of the upper bracket and an upper end of the lower bracket are axially opposite to each other with a gap intervening therebetween, so that a portion of an outer circumferential surface of the stator is exposed.

* * * * *